Jan. 28, 1969   W. L. GODFREY   3,424,549
MULTISTAGE SEPARATION OF COMPONENTS OF A SOLUTION
Filed Sept. 27, 1965
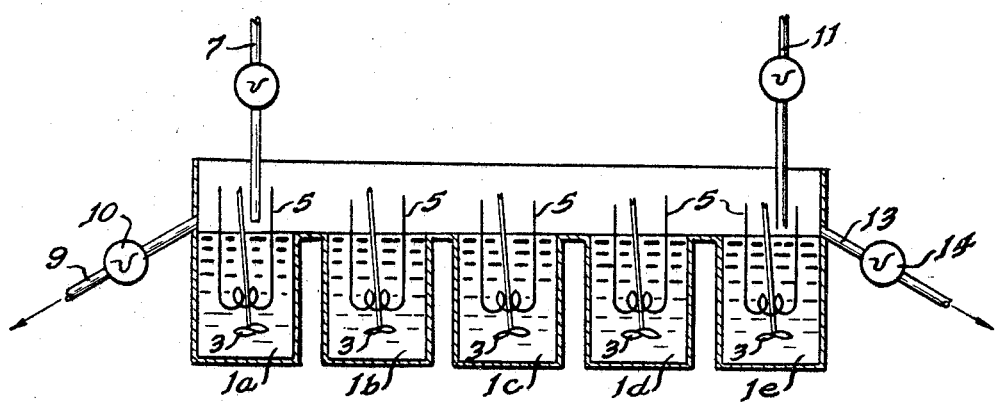
INVENTOR.
Wesley L. Godfrey
BY
Roland A. Anderson
Attorney United States Patent Office 3,424,549
Patented Jan. 28, 1969

3,424,549
MULTISTAGE SEPARATION OF COMPONENTS OF A SOLUTION
Wesley L. Godfrey, Pasco, Wash., assignor to the United States of America as represented by the United States Atomic Energy Commission
Filed Sept. 27, 1965, Ser. No. 490,753
U.S. Cl. 23—22    6 Claims
Int. Cl. C22b 59/00; C01f 7/66

ABSTRACT OF THE DISCLOSURE

A "batch-continuous" process for the separation of constituents of a solution is disclosed which utilizes a series of vessels arranged to overflow from one to the other in both directions and to discharge liquid from both ends of the series. Feed solution is introduced at one end (the "feed end") and wash solvent at the other end (the "wash end") of the series. Conditions are changed so that one solute (solute A) is transferred to an immobile (usually solid) phase in all vessels while a second solute (solute B) is left in solution. An increment of wash solvent is introduced, and solution is allowed to overflow from the "feed end" of the series, removing solute B in solution. Conditions are then changed to return solute A to solution and an increment of feed solution is introduced, with the overflow being at the "wash end" of the series, removing solute A in solution. This sequence of steps is repeated continuously, with solute A being discharged from the "wash end" of the series and solute B from the "feed end."

Contractual origin of the invention

The invention herein described was made in the course of, or under, a contract with the U.S. Atomic Energy Commission.

Background

In the separation of components of a mixture, countercurrent operations are common. For example, mutually insoluble liquids flowing in countercurrent relationships are employed in solvent extraction, distillation and gas absorption processes. With somewhat more difficulty, solids and liquids have been caused to move more or less in countercurrent relationships in leaching, ion exchange, and other processes.

Instead of true countercurrent flow, "batch-continuous" processes have also been used. For example, ion exchange processes have been devised in which the ion exchange resin is held in a series of containers or columns. By means of reservoirs and valves each batch of resin is contacted with successive batches of feed and solvent in such a manner as to provide a "pseudo-countercurrent" relationship between solids and liquids.

The "batch-continuous" processes, while offering many advantages, particularly when a solid phase is involved, have been characterized by complicated apparatus involving multiple reservoirs and complicated piping or mechanical systems.

Summary of invention

I have devised a method of falling in the "batch-continuous" category which avoids many of the problems of both the true countercurrent processes and the prior art "pseudo-countercurrent" processes of the "batch-continuous" type. It is applicable to the separation of a solute which I shall designate A from other solutes B, A and B being initially dissolved in solvent C.

It is necessary for the operation of my process that, under one set of conditions, solute A be susceptible to transfer from the solution to another phase preferentially as compared with B, and that under another set of conditions A be transferred back to the solution.

Examples of processes to which my method is applicable are crystallization, ion exchange or other absorption or adsorption processes, and solvent extraction.

In crystallization, changes in temperature may cause component A, because of its temperature-solubility characteristics or concentration, to preferentially crystallize out on cooling and redissolve on heating.

In ion exchange, component A may be preferentially absorbed or adsorbed under one condition of pH, temperature, or other characteristics and eluted under another condition.

In solvent extraction component A, which may be, e.g., uranium or plutonium, may be preferentially dissolved in a given solvent immiscible with C at one oxidation state and preferentially dissolved in C at another oxidation state.

Detailed description

The drawing shows diagrammatically an embodiment of my process.

I employ a series of vessels, $1a$, $1b$, etc., which are so connected that liquid can overflow from each into the next. The vessels are provided with agitating means 3 and condition-modifying means 5. The condition-modifying means 5 may be, for example, heating and cooling coils, or pipes for the introduction of reagents.

At the first end of the series is a feed inlet 7 and a waste outlet 9, the latter being provided with an outlet valve 10. At the second end of the series are a fresh solvent inlet 11 and a product outlet 13, the latter being provided with an outlet valve 14.

In carrying out my process, the outlet valves 10 and 14 are closed. A feed comprising solutes A and B in a solvent C is introduced at inlet 7 into vessel $1a$, from which it overflows into vessels $1b$, $1c$, etc., eventually filling them all.

Conditions are now changed in all the vessels in such a manner as to cause solute A to be transferred to what I will term an "immobile phase." For example, the vessels may be cooled to cause solute A to crystallize, the pH or other conditions may be changed to cause solute A to become fixed in an ion exchange resin contained in the vessels, the oxidation state of solute A or other conditions may be changed to cause solute A to be selectively extracted into a solvent immiscible with solvent C contained in each of the vessels.

Fresh solvent C is now introduced at inlet 11 while outlet valve 14 remains closed, outlet valve 10 being opened. The addition of solvent causes liquid containing solute B to overflow from vessel $1a$ through outlet 9, while the concentration of B in vessel $1e$, and to a lesser extent the other vessels, is lowered by dilution. Valve 10 is now closed and conditions are changed in all the vessels in such a manner as to cause solute A to be redissolved in solvent C.

Additional feed is now introduced at inlet 7. Valve 14 is opened. This causes the liquid from vessel $1e$ to overflow at 13. The concentration of A is greater and the concentration of B is less in this overflow than in the original feed.

These steps are then repeated. At each repetition or cycle the concentration of B in the overflow at outlet 13 becomes less until, when steady state is reached, it may be substantially zero. When steady state is reached, the product containing A is collected. Preferably, agitating means 3 are operated continuously to provide as nearly perfect mixing as possible. Baffles, screens or the like reduce overflow of solids from one vessel to another and preferably prevent such overflow during the feed portion of each cycle. The increments of feed and fresh solvent added at inlets 7 and 11 respectively are small relative to the capacity of the series of vessels.

The amounts of feed and backwash per cycle, relative to each other and to the volume of any one vessel determine the operating characteristics of the system, e.g., if the wash stream is large with respect to the feed stream, for a constant vessel volume, the product will be relatively pure, but the recovery relatively small, whereas if the relationship of the two streams is reversed, a less pure product will be obtained at a greater recovery efficiency. When a constant ratio is held between feed and wash increments and the amounts are decreased with respect to the vessel volume, the separation efficiency approaches asymptotically a maximum corresponding to an infinitely small increment.

My process, as just described, is advantageous in various situations where it is undesirable to move one of the phases. Examples of such situations are processes in which one phase is a solid and transfer thereof would be difficult and processes in which a solvent, because its volume, viscosity, density, or other character, would be difficult or expensive to move.

It is particularly advantageous as applied to the treatment of highly radioactive solutions requiring remote handling.

Formidable problems arise when trying to operate a liquid-solids handling system such as is normally used in crystallization or ion exchange equipment in a remotely operated and maintained plant. In certain plants for the reprocessing of nuclear fuel, equipment is accessible only from a lead-shielded overhead crane using monocular periscope vision and equipped with suspended impact wrenches and an assortment of hooks. Obviously any maintenance other than installation and removal is virtually impossible. My process requires no transfer of solids. The only moving parts required are agitators and a small number of valves. Agitators have been found to be among the most trouble free pieces of apparatus under remote-handling conditions. Moreover, when the solids are near the density of the liquid, gas spargers can be used instead of mechanical agitators. Valves for use under remote-handling conditions are highly developed. Moreover, many of the valves can be located outside the radioactive zone.

Specific examples of my process will now be described:

EXAMPLE 1.—CRYSTALLIZATION

To simulate the application of the crystallization process to the recovery of aluminum nitrate nonahydrate from the acid waste obtained from the Redox process, a feed solution was prepared by dissolving aluminum nitrate nonahydrate (ANN) in 57% nitric acid. Different batches were "spiked" with tracer quantities of fission products. Utilizing apparatus as shown in the drawings, elements, 5 being heating-cooling coils, the process was carried out by first filling the vessels with feed solution then cooling all vessels to cause crystallization of ANN. An increment of wash solvent was added at 11 and a corresponding amount of waste stream withdrawn at 10. The temperature was then raised to redissolve the ANN, an increment of feed was added at 7 and a corresponding amount of product withdrawn at 14.

The cycle of feed addition, cooling, waste cooling and heating were repeated until steady state was attained.

The conditions and results of one run are tabulated in Table I.

Table I

| | |
|---|---|
| Feed composition | 11 g./l. Al, 52,583 c.p.m. $Ru^{106}$-$Rh^{106}$ in 57% $HNO_3$. |
| Wash composition | 57% $HNO_3$. |
| Number of vessels | 12. |
| Volume per vessel | 1200 ml. |
| Feed increment | 960 ml. |
| Wash increment | 2400 ml. |
| Temp., hot stage | 80° C. |
| Temp., cold stage | 10° C. |
| Cycles to steady state | About 30. |
| Waste stream composition | 10 g./l. Al, 37,314 c.p.m. $Ru^{106}$-$Rh^{106}$. |
| Product | 2.3 g./l. Al, <50 c.p.m. $Ru^{106}$-$Rh^{106}$. |

The term "c.p.m." means counts per minute and is a measure of the concentration of the radioactive isotopes. On a weight basis, the ratio of Ru-Rh/Al in the feed was about $1 \times 10^{-5}$. In the product it was about $7 \times 10^{-9}$. This represents a decontamination factor of about $1 \times 10^4$.

The experiment was repeated, using feed "spiked" with (a) $Zn^{95}$-$Nb^{95}$ and (b) $Sr^{85}$ representative of other isotopes present in the Redox acid waste. Comparable results were secured in all cases.

A mathematical model describing the operation of the system under all reasonable variations in operating parameters is included in my paper entitled "Countercurrent Crystallization," presented at the San Francisco meeting of the American Institute of Chemical Engineers, May 16–19, 1965 as Paper No. 14E and available as a preprint from the Institute.

EXAMPLE 2.—ION EXCHANGE

The radioisotopes cesium-137 and cerium-144 are constituents of acidic wastes produced in the chemical reprocessing of nuclear fuels. They can be separated from each other by utilizing ion exchange in accordance with my invention.

The ion exchange resin which is employed is of the strongly acidic type exemplified by Dowex-50, a sufonated polystyrene cross-linked by di-vinyl benzene, and Duolite C-3, a sulfonated pheonolic resin having the active group —$CH_2SO_3^-$. The transfer between the solid and liquid phases is based on the fact that the relation of the ion exchange equilibria of cerium and cesium with this type of ion exchanger is markedly affected by the pH of the solution.

A feed solution of the following composition is employed:

| | | |
|---|---|---|
| $Ce^{+++}$ | g./liter | 0.015 |
| $Cs^{+++}$ | g./liter | 0.015 |
| $KNO_3$ | M | 0.1 |
| Citric acid | M | 0.005 |

$HNO_3$ and KOH employed as pH modifying agents. The ion exchange resin is Duolite C-3.

I have found that in this system satisfactory results are secured by operating alternately at pH 2.5 and pH 4.5. The effect is expressed in terms of the distribution coefficient $K_D$ which is defined as:

$$K_D = \frac{\text{Moles/g. resin}}{\text{Moles/cc. solution}}$$

For the ions to be separated, these values have been found to be as follows:

| $K_D$ | | pH |
|---|---|---|
| $Cs^+$ | $Ce^{+++}$ | |
| 170 | 1,500 | 2.5 |
| 145 | 19 | 4.5 |

Cerium can therefore be caused to transfer to the solid phase at pH 2.5 and back into solution at pH 4.5, while cesium is only slightly affected by the changes in pH. Cerium is therefore "solute A" of the general description while the cesium is "solute B." Cerium can be recovered substantially free of cesium.

The same series of vessels employed in Example 1 is utilized. Elements 5 are, in this case, pipes for the addition of aqueous $HNO_3$ and KOH. The conditions and results of one run are shown in Table II.

*Table II*

Feed composition:
| | | |
|---|---|---|
| $Ce^{+++}$ | g./l | 0.15 |
| $Cs^+$ | g./l | 0.15 |
| Citric acid | M | 0.005 |
| $KNO_3$ | M | 0.1 |

Wash composition:
| | | |
|---|---|---|
| Citric acid | M | 0.005 |
| $KNO_3$ | M | 0.1 |
| Number of vessels | | 12 |
| Volume per vessel | ml | 1200 |
| Volume of resin per vessel | ml | 600 |
| Volume of liquid per vessel (free volume +⅓ volume of resin) | ml | 800 |
| Feed increment | ml | 200 |
| Wash increment | ml | 800 |
| Number of cycles | | 100 |
| Cerium recovery | Percent | 23 |
| Decontamination factor | | $1 \times 10^5$ |

$$\text{Decontamination factor} = \frac{\text{g. Cs/g. Ce in feed}}{\text{g. Cs/g. Ce in product}}$$

This set of conditions gives a very pure product but low recovery.

EXAMPLE 3.—ION EXCHANGE

The run described in Example 2 is repeated except for the items tabulated in Table III.

*Table III*

| | | |
|---|---|---|
| Feed increment | ml | 200 |
| Wash increment | ml | 200 |
| Cerium recovery | Percent | 56 |
| Decontamination factor | | $6 \times 10^4$ |

In other words the recovery is about twice that of Example 2, but the decontamination factor is only slightly more than half as high.

EXAMPLES 4 AND 5.—ION EXCHANGE

The next two examples show the effect of changing the absolute magnitudes of the feed and wash increments, while keeping their relative magnitudes at 1:1.

Conditions are the same as for Example 2, unless otherwise noted.

TABLE IV

| | Example 4 | Example 5 |
|---|---|---|
| Feed increment (ml.) | 800 | 1,600 |
| Wash increment (ml.) | 800 | 1,600 |
| No. of cycles | 100 | 81 |
| Recovery of cerium (percent) | 99.6 | 99.7 |
| Decontamination factor | 100 | 50 |

The following examples show the effect of more extreme sets of conditions.

EXAMPLES 6 AND 7.—ION EXCHANGE

Again, the conditions are those of Example 2 unless otherwise specified:

TABLE V

| | Example 6 | Example 7 |
|---|---|---|
| Feed increment (ml.) | 800 | 4,000 |
| Wash increment (ml.) | 200 | 800 |
| No. of cycles | 100 | 52 |
| Recovery of cerium (percent) | 97.9 | 98.7 |
| Decontamination factor | 62 | 1.8 |

In Example 7, where the size of the feed increment approaches half the liquid volume of the entire series of vessels, no practical decontamination is obtained.

It will be understood that various other modifications of my basic process are possible. I therefore wish my invention to be limited solely by the scope of the appended claims.

The embodiments of the invention in which an exclusive property or privilege is claimed are defined as follows:

1. A method of separating a pure solute designated A from other solutes B, said solutes A and B being constituents of a solution in a solvent designated C comprising providing a series of vessels arranged to overflow from one to the other in either direction and arranged to discharge liquid from both the first end and the second end of said series, filling said vessels with said solution and thereafter carrying out the following steps:

(a) changing the conditions in all said vessels so as to cause solute A to be transferred from the solution to a separate immobile phase while leaving solutes B in solution;

(b) introducing at the second end of said series an increment of substantially pure solvent C, having a volume which is small compared to the total volume of said series, while withdrawing a like volume of liquid from the first end of the series and while retaining the immobile phase in each of said vessels;

(c) changing the conditions in all said vessels to cause solute A to transfer from said immobile phase to said solution;

(d) introducing at the first end of said series an increment of feed solution having a volume which is small relative to the total volume of said series;

continually repeating said steps (a) through (d) and, after steady state is attained, recovering from the second end of said series a solution of solute A substantially free of solutes B.

2. A process as defined in claim 1 wherein said immobile phase is solid.

3. A process as defined in claim 2 wherein said solid comprises crystals of A and the condition which is changed is the temperature.

4. A process as defined in claim 2 wherein solutes A and B are ions, said solid comprises an ion exchange material and the condition which is changed is one which affects the ion-exchange equilibrium of A relative to that of B.

5. The process of claim 3 wherein solute A is aluminum nitrate, the solutes B are fission products of a nuclear fuel, solvent C is nitric acid and the solid phase comprises crystals of aluminum nitrate nonahydrate.

6. The process of claim 4 wherein solute A is cerium ion, solute B is cesium ion, solvent C is an aqueous solution of citric acid and potassium nitrate, the ion exchange material is a strongly acidic ion exchange resin and the condition which is changed is the pH of the solution.

References Cited

Godfrey et al.: "U.S. Atomic Energy Commission Report, HW-82771PT1," July 1964, pp. 1, 3–4, 5, 6 and 8 relied on.

HERBERT T. CARTER, *Primary Examiner.*

U.S. Cl. X.R.

23—102, 23, 1, 296, 305, 25; 252—301.1